B. STRASSLE.
Parlor Swings.
No. 135,018. Patented Jan. 21, 1873.
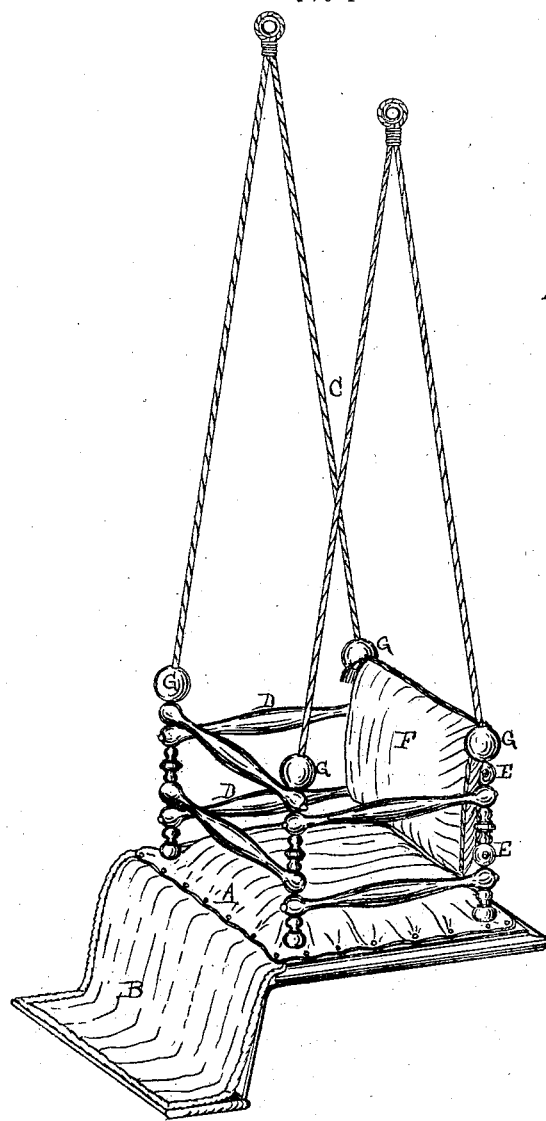
Fig I
Fig II
Attest
H. S. Sprague
H. F. Eberts
Inventor
B. Strassle
By Atty
Thos. S. Sprague

UNITED STATES PATENT OFFICE.

BENEDIKT STRÄSSLE, OF CHICAGO, ILLINOIS.

IMPROVEMENT IN PARLOR SWINGS.

Specification forming part of Letters Patent No. 135,018, dated January 21, 1873.

*To all whom it may concern:*

Be it known that I, BENEDIKT STRÄSSLE, of Chicago, in the county of Cook and State of Illinois, have invented a new and useful Improvement in Parlor Swings; and I do declare that the following is a true and accurate description thereof, reference being had to the accompanying drawing and to the letters of reference marked thereon and being a part of this specification, in which—

Figure 1 is a perspective of the swing. Fig. 2 is a vertical section through one of the friction-balls.

Like letters indicate like parts in each figure.

The nature of this invention relates to an improved construction of a swing, which may be suspended from hooks screwed inside the door-frame of a house, or from the ceiling, forming a perfectly safe device for the amusement of small children. The invention consists in the peculiar construction and arrangement of the various parts, as more fully hereinafter described.

In the accompanying drawing, A represents a seat, suitably upholstered, provided with a foot-rest, B, and suspended by means of the cords C. D are rods, with holes bored through them near their ends through which the suspending-cords pass, and these rods form the sides of the seat. E are similar rods, similarly secured to form the back and front guards of the seat. F is a removable cushion for the back. G are guard-balls, with holes through them, through which the suspension-cords pass. These holes through the balls do not pass straight through them, but are crooked, as shown in Fig. 2, so that when the suspension-cords are stretched by the weight of the child the friction will prevent the child removing them. Consequently, as these balls act as stops, the child cannot remove the rods which inclose and hold him in the seat.

What I claim as my invention, and desire to secure by Letters Patent, is—

1. In swings, the balls G for the purposes set forth.

2. The combination of the balls G with the cords C, rods D E, and seat A, substantially as described, and for the purposes set forth.

BENEDIKT STRÄSSLE.

Witnesses:
    WM. H. LOTZ,
    GEO. FERRIS.